(12) United States Patent
Neelakantan et al.

(10) Patent No.: US 8,677,852 B2
(45) Date of Patent: Mar. 25, 2014

(54) MULTIPLEXED ELECTROMECHANICAL ACTUATOR MECHANISM

(75) Inventors: Vijay A. Neelakantan, Rochester Hills, MI (US); Bret M. Olson, Whitelake, MI (US); James W. Haynes, Oxford, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 959 days.

(21) Appl. No.: 12/711,024

(22) Filed: Feb. 23, 2010

(65) Prior Publication Data

US 2011/0203401 A1    Aug. 25, 2011

(51) Int. Cl.
*F16H 59/04*    (2006.01)
*F16H 3/38*     (2006.01)

(52) U.S. Cl.
USPC .......................................... 74/473.36; 74/339

(58) Field of Classification Search
USPC ........ 74/473.1, 424.71, 424.72, 89.23, 89.28, 74/473.11, 473.12, 473.36, 473.37, 330, 74/340, 343, 371, 372; 192/3.56, 84.6, 94
See application file for complete search history.

(56) References Cited

U.S. PATENT DOCUMENTS

| | | | | |
|---|---|---|---|---|
| 1,838,096 A * | 12/1931 | Fleischel | ...................... | 74/336 R |
| 1,893,644 A * | 1/1933 | Fleischel | ......................... | 477/87 |
| 3,698,257 A * | 10/1972 | Ballentine et al. | ........... | 74/89.42 |
| 3,863,518 A * | 2/1975 | Webber et al. | ................... | 74/340 |
| 4,292,722 A * | 10/1981 | Worsham | ................... | 29/402.21 |
| 4,519,484 A * | 5/1985 | Nagaoka et al. | ............. | 192/3.58 |
| 5,460,060 A * | 10/1995 | Nellums | ................... | 74/473.12 |
| 5,517,876 A * | 5/1996 | Genise et al. | .............. | 74/473.24 |
| 5,557,154 A * | 9/1996 | Erhart | ............................. | 310/80 |
| 6,823,757 B2 * | 11/2004 | Kobayashi | ................. | 74/473.12 |
| 7,350,432 B2 * | 4/2008 | Somschor et al. | ............. | 74/335 |
| 7,421,922 B2 * | 9/2008 | Hamann et al. | ............ | 74/424.76 |
| 7,685,898 B2 * | 3/2010 | Lykkegaard | ................. | 74/89.26 |
| 8,070,649 B2 * | 12/2011 | Holmes | .............................. | 477/5 |
| 8,192,176 B2 * | 6/2012 | Lundberg et al. | ............. | 417/307 |
| 8,210,066 B2 * | 7/2012 | Bai et al. | .................... | 74/473.12 |
| 8,225,687 B2 * | 7/2012 | Lundberg et al. | ............... | 74/330 |
| 8,292,055 B2 * | 10/2012 | Wilton et al. | .............. | 192/85.56 |
| 8,337,363 B2 * | 12/2012 | Minami | ........................ | 477/180 |
| 8,356,529 B2 * | 1/2013 | Lundberg et al. | ............... | 74/340 |
| 8,359,941 B2 * | 1/2013 | Lundberg et al. | ............... | 74/340 |
| 8,402,855 B2 * | 3/2013 | Lundberg et al. | ............... | 74/335 |
| 8,402,859 B2 * | 3/2013 | Neelakantan et al. | ..... | 74/473.36 |
| 8,403,792 B2 * | 3/2013 | Lundberg et al. | ............. | 475/128 |
| 8,429,994 B2 * | 4/2013 | Lundberg et al. | ............... | 74/335 |
| 2004/0116249 A1 * | 6/2004 | Kayano et al. | ................ | 477/109 |
| 2006/0011008 A1 * | 1/2006 | Hara et al. | ................. | 74/473.36 |
| 2006/0032692 A1 * | 2/2006 | Ima et al. | ...................... | 180/249 |

(Continued)

*Primary Examiner* — Ha D Ho
*Assistant Examiner* — Jude Agendia

(57) ABSTRACT

A multiplexed electromechanical shift mechanism includes a single linear actuator with multiple independently selectable linkages actuating a clutch and multiple gears for use in motor vehicle transmissions such as a dual clutch transmission. The linear actuator may be a ball screw, a planetary roller screw or hydraulic or pneumatic operator capable of controlling bi-directional linear motion of an output member. A plurality of linear clutches selectively couple the output member to one of a plurality of linkages adapted to transfer the bi-directional motion of the output member. One of the linkages is coupled to and engages an input (main) clutch of the transmission and the remaining linkages are coupled to and bi-directionally translate shift forks and synchronizer clutches which achieve gear selection and engagement.

18 Claims, 3 Drawing Sheets

(56) References Cited

U.S. PATENT DOCUMENTS

2010/0229668 A1* 9/2010 Smith ..................... 74/473.1
2010/0313707 A1* 12/2010 Akashi et al. ............... 74/665 R
2011/0061487 A1* 3/2011 Tooman et al. ............ 74/473.36
2011/0100144 A1* 5/2011 Neelakantan et al. ..... 74/473.36

* cited by examiner

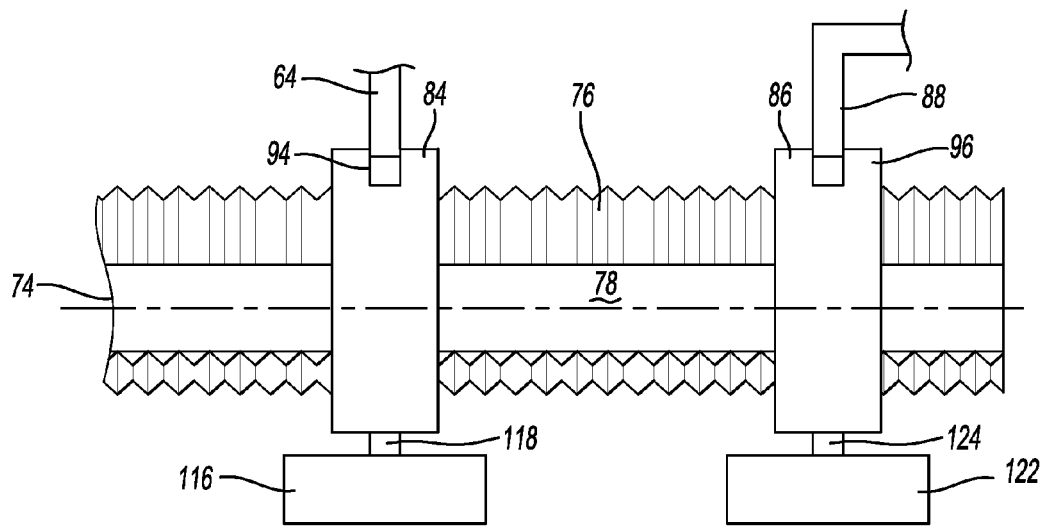
Fig-2
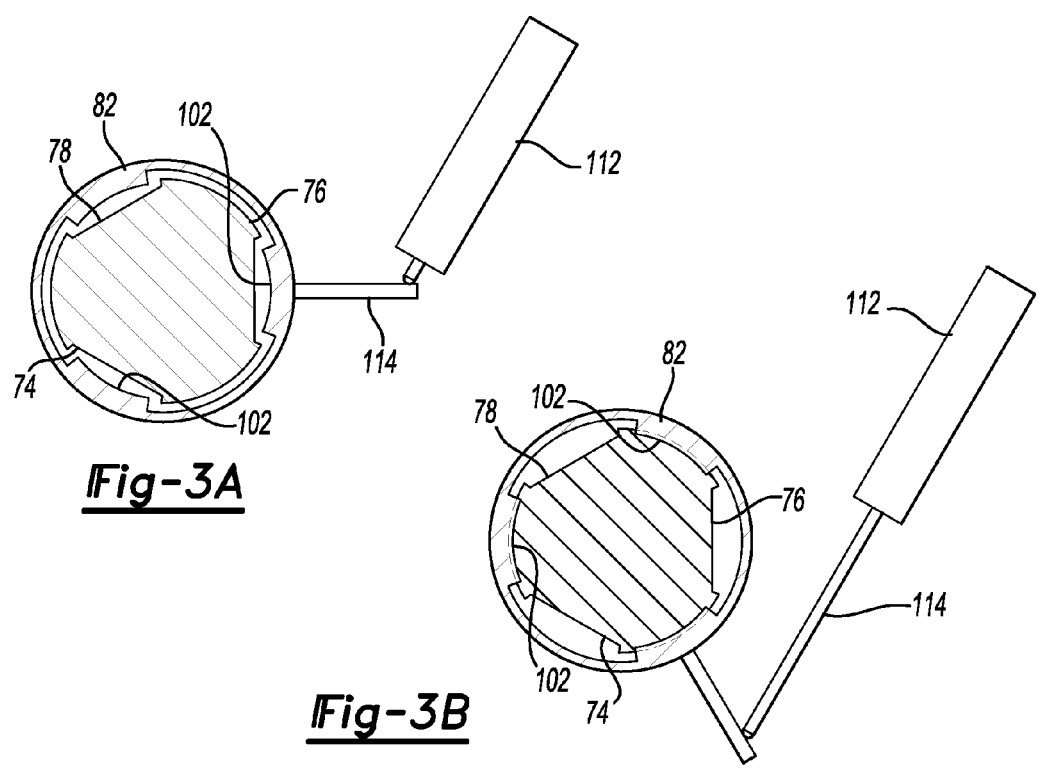
Fig-3A
Fig-3B

MULTIPLEXED ELECTROMECHANICAL ACTUATOR MECHANISM

FIELD

The present disclosure relates to a multiplexed electromechanical mechanism for clutch and gear actuation in a motor vehicle transmission and more particularly to a multiplexed electromechanical mechanism having a single actuator with multiple independently selectable linkages actuating a clutch and multiple gears in a motor vehicle transmission.

BACKGROUND

The statements in this section merely provide background information related to the present disclosure and may or may not constitute prior art.

Gear shift assemblies for motor vehicle transmissions take several forms. In a typical manual transmission, a plurality of parallel shift rails are acted upon by an operator manipulated shift lever and include shift forks which engage and translate synchronizers and clutches which engage a desired gear. In automatic transmissions, hydraulically operated clutches and brakes controlled by a plurality of logic and control valves engage, disengage and brake elements of planetary gear assemblies. In a newer transmission type, the dual clutch transmission (DCT), a plurality of synchronizer clutches on two countershafts are translated into and out of engagement by associated actuators and two input clutches alternately drive the countershafts.

Such dual clutch transmissions typically provide five, six or seven forward gears or speeds and reverse. In a dual clutch transmission having five forward gears and reverse, at least three actuators, three shift linkages and three double synchronizers will be required. The actuators which will typically be bi-directional, electric or hydraulic devices will generally be the most expensive components of the shift assembly. In a typical six speed dual clutch transmission, at least four actuators, four shift linkages, three double synchronizers and one single synchronizer will be required. Again, the actuator devices will generally be the most expensive components of the shift assembly.

Because of their excellent fuel economy and sporty performance, including the ability to complete rapid shifts which parallels that of a manual transmission, dual clutch transmissions are gaining recognition and acceptance in the marketplace. Given this trend, activity directed to improving all aspects of dual clutch transmission design and operation is ongoing and the present invention is the result of such activity.

SUMMARY

The present invention provides a multiplexed electromechanical mechanism having a single linear actuator with multiple independently selectable linkages actuating a clutch and engaging multiple gears for use in motor vehicle transmissions such as a dual clutch transmission. The linear actuator may be a ball screw, a planetary roller screw or hydraulic or pneumatic operator capable of controlling bi-directional linear motion of an output member. A plurality of linear clutches selectively couple the output member to one of a plurality of linkages adapted to transfer the bi-directional motion of the output member. One of the linkages is coupled to and engages an input (main) clutch of the transmission and the remaining linkages are coupled to and bi-directionally translate shift forks and synchronizer clutches which achieve gear selection and engagement.

This arrangement exploits the fact that, in a dual clutch transmission, odd gears are typically selected while the even clutch is engaged after which the odd clutch is engaged and a new even gear is selected. Stated somewhat differently, in a dual clutch transmission, it is never necessary (or desirable) to undertake gear changes and engage the input clutch on the same countershaft at the same time. This results from the configuration of a typical dual clutch transmission wherein all odd numbered gears are grouped together on one countershaft and associated with an odd gear input clutch and the even numbered gears and an even gear clutch are similarly disposed on the other countershaft.

Thus it is an aspect of the present invention to provide an actuator and linkage assembly for selecting certain gears and engaging one clutch of a motor vehicle transmission.

Thus it is a further aspect of the present invention to provide a multiplexed actuator and linkage assembly for selecting certain gears and engaging one clutch of a dual clutch transmission.

It is a still further aspect of the present invention to provide a ball screw, a planetary roller screw or hydraulic or pneumatic operator and a linkage assembly for selecting certain gears and engaging one clutch of a motor vehicle transmission.

It is a still further aspect of the present invention to provide a ball screw, a planetary roller screw or hydraulic or pneumatic operator and linkage assemblies for selecting certain gears and engaging one clutch of a dual clutch transmission.

It is a still further aspect of the present invention to provide a multiplexed actuator having a linear output member and a plurality of linkage assemblies for selecting certain gears and engaging one clutch of a dual clutch transmission.

It is a still further aspect of the present invention to provide a multiplexed actuator having a linear output member and linkage assemblies including linear clutches for selecting certain gears and engaging one clutch of a dual clutch transmission.

It is a still further aspect of the present invention to provide a multiplexed actuator and a plurality of linkage assemblies to be utilized in pairs for selecting gears and engaging clutches in a dual clutch transmission.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is an enlarged side elevational view of a linear actuator output member including two linear clutch collars according to the present invention; and FIG. 3A is an schematic end view of a linear actuator output member and linear clutch collar according to the present invention in a first, disengaged position;

FIG. 3B is an schematic end view of a linear actuator output member and linear clutch collar according to the present invention in a second, engaged position.

DETAILED DESCRIPTION

The following description is merely exemplary in nature and is not intended to limit the present disclosure, application, or uses.

Figure 1:
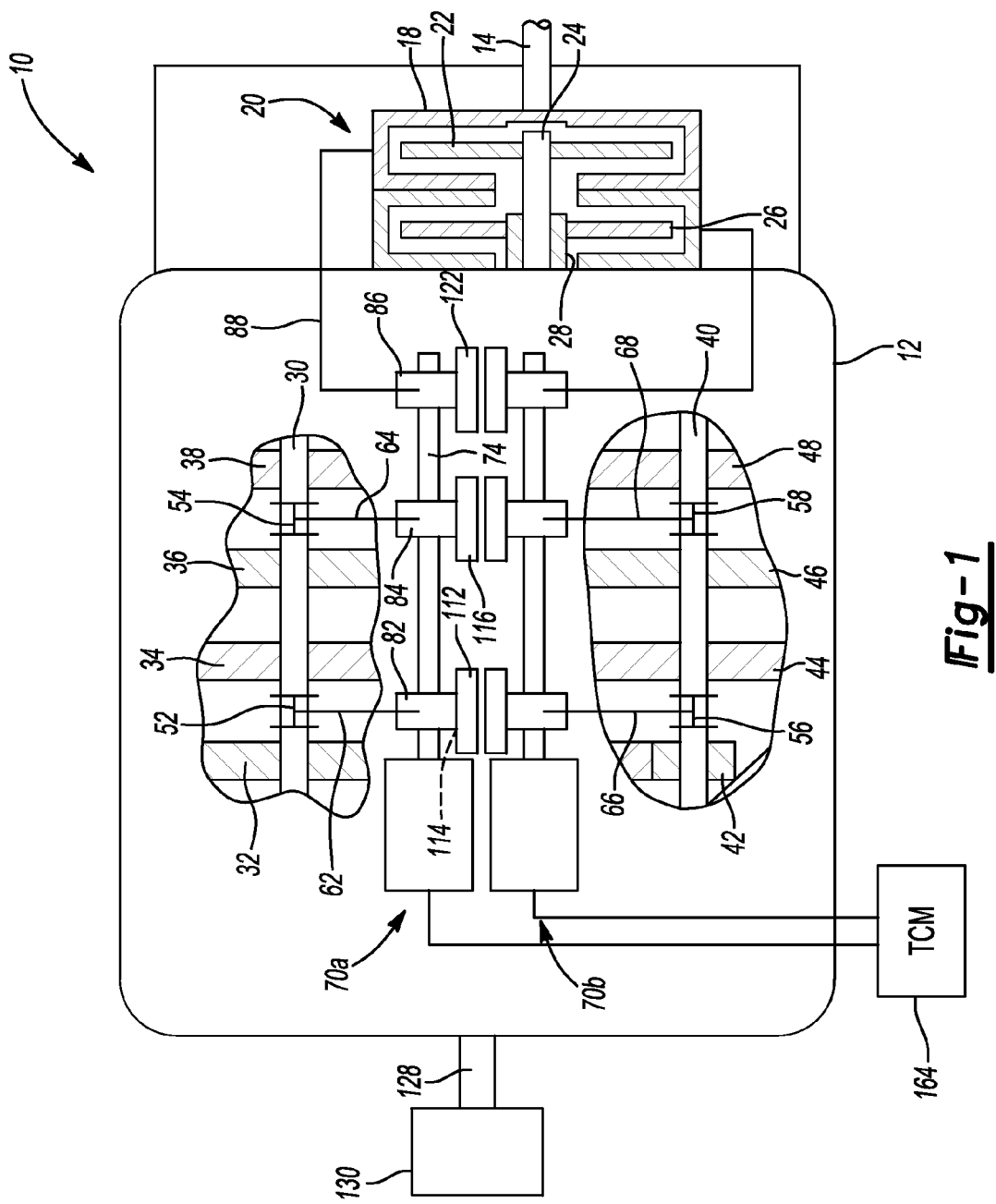
FIG. 1 is a schematic, top plan view of an exemplary dual clutch transmission incorporating the present invention.

With reference to FIG. 1, a typical dual clutch transmission is illustrated and generally designated by the reference number 10. The transmission 10 includes a housing 12 having a plurality of openings, bores and flanges that receive, locate and support as well as provide protection to, the various components disposed within the transmission 10. The transmission 10 includes an input shaft 14 which is coupled to and driven by the output of a gasoline, flex fuel or Diesel engine, hybrid power plant or electric motor (not illustrated). The input shaft 14 is connected to an input structure or drive housing 18 of a dual clutch assembly 20.

The dual clutch assembly 20 includes a first main or input clutch 22 associated with the odd numbered gears of the transmission 10 and having a first clutch output shaft 24 that drives components within the transmission 10 and a second main or input clutch 26 associated with the even numbered gears and reverse of the transmission 10 and having a second clutch output quill, drive tube or member 28 that also drives components within the transmission 10. A first countershaft 30 which is associated with the first main clutch 22 includes a first plurality of gears 32, 34, 36 and 38 freely rotatably disposed thereupon. The gears 32, 34, 36 and 38 may correspond to, for example, all of the odd numbered gears, namely, first, third, fifth and seventh in a seven speed transmission. A second countershaft 40 which is associated with the second main clutch 26 includes a second plurality of gears 42, 44, 46 and 48 which are freely rotatably disposed thereupon. The gears 42, 44, 46 and 48 may correspond to, for example, reverse and all of the even numbered gears, namely, second, fourth and sixth.

Disposed about the first countershaft 30 and between the gears 32 and 34 is a first synchronizer clutch 52. The first synchronizer clutch 52 may be bi-directionally translated along the first countershaft 30 to first synchronize and then couple one of the gears 32 or 34 to the first countershaft 30. A second synchronizer clutch 54 is disposed about the first countershaft 30 between the gears 36 and 38. The second synchronizer clutch 54 may be bi-directionally translated along the first countershaft 30 to first synchronize and then couple one of the gears 36 or 38 to the first countershaft 30.

Disposed about the second countershaft 40 and between the gears 42 and 44 is a third synchronizer clutch 56. The third synchronizer clutch 56 may be bi-directionally translated along the second countershaft 40 to first synchronize and then couple one of the gears 42 or 44 to the second countershaft 40. A fourth synchronizer clutch 58 is disposed about the second countershaft 40 between the gears 46 and 48. The fourth synchronizer clutch 58 may be bi-directionally translated along the second countershaft 40 to first synchronize and then couple one of the gears 46 or 48 to the second countershaft 40.

The first synchronizer clutch 52 is engaged and translated by a first shift fork and rail assembly 62; the second synchronizer clutch 54 is engaged and translated by a second shift fork and rail assembly 64; the third synchronizer clutch 56 is engaged and translated by a third shift fork and rail assembly 66 and the fourth synchronizer clutch 58 is engaged and translated by a fourth shift fork and rail assembly 68.

Referring now to FIGS. 1, 2 and 3A and 3B, the dual clutch transmission 10 also includes a pair of multiplexed shift actuator assemblies 70A and 70B which are essentially identical. The first multiplexed shift actuator assembly 70A is associated with the first countershaft 30, the odd numbered gears 32, 34, 36 and 38, the first and second synchronizer clutches 52 and 54, the first and second shift fork and rail assemblies 62 and 64 and the first input clutch 22. The second multiplexed shift actuator assembly 70B is associated with the second countershaft 40, reverse and the even numbered gears 42, 44, 46 and 48, the third and fourth synchronizer clutches 56 and 56, the third and fourth shift fork and rail assemblies 66 and 66 and the second input clutch 26. Accordingly, only the first multiplexed shift actuator assembly 70A will be fully described.

The first multiplexed shift actuator assembly 70A includes a bi-directional linear actuator 72, which will be more fully described below, and may be, for example, a ball screw or planetary roller screw device or a hydraulic or pneumatic piston and cylinder assembly preferably having a linear output position sensor or transducer. The bi-directional linear actuator 72 includes an elongate output shaft or member 74. The elongate output member 74 defines circumferentially interrupted male threads 76 along its length. The male threads 76 may have any conveniently formed, preferably symmetrical profile such as American Standard or knuckle, for example. The male threads 76 have no lead, that is, they are straight, not helical. As best illustrated in FIG. 3, the male threads 76 are circumferentially discontinuous, that is, they extend over three discontinuous circumferential regions of slightly less than 60° which alternate with three circumferential regions 78 of approximately 60° which are not threaded. The ends of the threads 76 adjacent the open (unthreaded) regions 78 are preferably beveled or chamfered to present oblique surfaces to assist thread engagement and avoid thread butt.

At axially spaced apart locations along the output member 74 are a plurality of linear clutches including a first shift collar 82, a second shift collar 84 and a third clutch collar 86. The first shift collar 82 is connected to and bi-directionally translates the first shift fork and rail assembly 62 through a first coupling 92 which allows relative rotation between the first shift collar 82 and the first shift fork and rail assembly 62. The second shift collar 84 is connected to and bi-directionally translates the second shift fork and rail assembly 64 through a second coupling 94 which allows relative rotation between the second shift collar 84 and the second shift fork and rail assembly 64. The third clutch collar 86 is connected to and bi-directionally translates a first clutch linkage assembly 88 which engages and disengages the first input clutch 22 through a third coupling 96 which allows relative rotation between the third clutch collar 86 and the first clutch linkage assembly 88.

Each of the shift and clutch collars 82, 84 and 86 includes discontinuous internal (female) threads 102 which are configured in an arrangement complementary to the male threads 76 on the output shaft or member 74. That is, the female threads 102 are preferably a symmetrical profile such as American Standard or knuckle, for example, with no lead. They must, of course, be the complementary to and engageable with the male threads 76. They are also arranged in an internal, discontinuous arrangement having three regions of threads 102 of slightly less than 60° equally spaced with three approximately 60° regions 104 without threads. In a like manner, the ends of the threads 102 adjacent the open (unthreaded) regions 104 are preferably beveled or chamfered to present oblique surfaces to assist thread engagement and avoid thread butt.

Associated with each of the shift and clutch collars 82, 84 and 86 is a two position actuator such as an electric solenoid or hydraulic or pneumatic piston and cylinder assembly. A first shift actuator 112 rotates the first shift collar 82 through approximately 60° through a linkage 114 to fully engage or release the threads 76 and 102 within the first shift collar 82 and axially couple or uncouple it to the output member 74. A second shift actuator 116 rotates the second shift collar 84 through approximately 60° through a linkage 118 to fully engage or release the threads 76 and 102 within the second shift collar 84 and axially couple or uncouple it to the output member 74. A third clutch actuator 122 rotates the third clutch collar 86 through approximately 60° through a linkage 124 to fully engage or release the threads 76 and 102 within the third clutch collar 86 and axially couple or uncouple it to the output member 74.

While three alternating threaded and unthreaded regions have been found to provide excellent operation and service life, it is acknowledged that more or fewer threaded regions in the collars 82, 84 and 86 and the output member 74 may be utilized with corresponding adjustment of the rotation of the collars 82, 84 and 86. Fewer regions, for example, two alternating threaded and unthreaded regions each extending over approximately 90° would require greater (approximately 90°) rotation of the collars 82, 84 and 86 whereas more threaded regions, for example four alternating threaded and unthreaded regions would require lesser (approximately 45°) rotation of the collars 82, 84 and 86 whereas six alternating threaded and unthreaded regions would require even less (approximately 30°) rotation of the collars 82, 84 and 86.

Finally, the transmission 10 includes an output shaft 128 which directly drives a final drive assembly 130 which may include a prop shaft, a differential, axles and wheels and tires (all not illustrated).

Operation is straightforward. To select, for example, fifth gear which for purposes of illustration and explanation will be assumed to be the gear 36 on the first countershaft 30, the second actuator 116 is energized to rotate the second shift collar 84 from the position illustrated in FIG. 3A to the position illustrated in FIG. 3B. With the female threads 102 engaged by the male threads 76, the second shift collar 84 is connected to the output member 74 and actuation of the bi-directional linear actuator 72 translates the output member 74, the second shift collar 84, the second shift fork and rail assembly 64 and the second synchronizer clutch 54 to the left in FIG. 1 to first synchronize and then couple the gear 36 to the first countershaft 30. Then, the second shift actuator 116 is de-energized to uncouple the second shift collar 84 from the output member 74 and the third clutch actuator 122 is energized to rotate the third clutch collar 86, engage the male threads 76 and the female threads 102 and couple the output member 74 to the first input clutch linkage assembly 88. Bi-directional motion of the output member 74 may then be utilized to engage and disengage the first input clutch 22. It will be appreciated that while the foregoing fifth gear selection process is occurring, the transmission 10 may be operating in fourth gear, for example, the gear 46 of the second countershaft 40 which has been selected through a similar series of steps by the second multiplexed shift actuator assembly 70B and engagement of the second input clutch 26.

Figure 4:
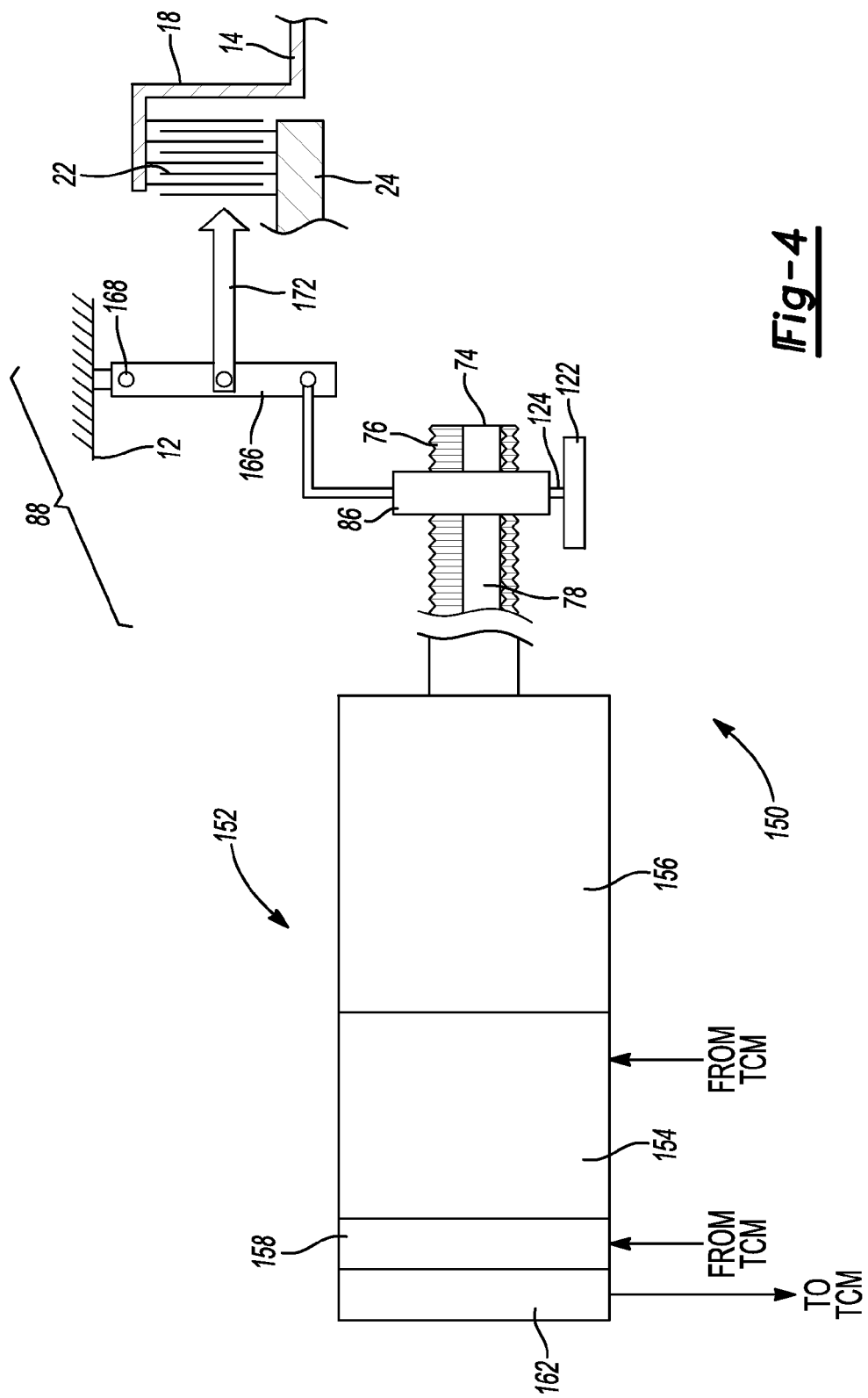
FIG. 4 is a diagrammatic view of a planetary roller screw actuator and clutch linkage according to the present invention.

Referring now to FIG. 4, a preferred bi-directional linear actuator and clutch linkage assembly is illustrated and generally designated by the reference number 150. The bi-directional linear actuator and clutch linkage assembly 150 includes a planetary roller screw linear actuator 152 preferably including a bi-directional, three phase, brushless direct current (DC) motor 154 which directly drives a planetary roller screw assembly 156. An electromagnetic brake 158 is coupled to the output of the electric motor 154 and may be energized to inhibit rotation of the motor 154 and a change in the position of the output member 74 of the planetary roller screw linear actuator 152. A transducer 162 such as a Hall effect sensor may be included in the linear actuator 152 and utilized to provide data to a controller 164, illustrated in FIG. 1, such as a transmission control module (TCM) regarding the present position of the output member 74. Further details of the planetary roller screw linear actuator 152 may be obtained from U.S. Pat. No. 5,557,154 which is hereby incorporated by reference.

The output member 74, as described above, receives the third clutch collar 86 which is operably connected to one end of a second class lever 166 which forms a portion of the first clutch linkage assembly 88. The other end of the second class lever 166 is supported in a stationary pivot 168 which may be attached to the housing 12. A first clutch actuator link 172 connects an intermediate point of the second class lever 166 to the first input clutch 22. Translation of the output member 74 to the right in FIG. 4 translates the clutch linkage assembly 88 to the right and compresses the discs of the first input clutch 22, thereby transmitting torque from the input shaft 14 to the first clutch output shaft 24.

The description of the invention is merely exemplary in nature and variations that do not depart from the gist of the invention are intended to be within the scope of the invention. Such variations are not to be regarded as a departure from the spirit and scope of the invention.

What is claimed is:

1. A multiplexed mechanical shift assembly comprising, in combination,
    a bi-directional linear actuator having an elongate output member including axially extending segments of circumferentially discontinuous male threads,
    a plurality of spaced apart collars disposed about said output member, each of said collars including segments of discontinuous female threads complementary to said male threads,
    a two position actuator coupled to each of said collars for rotating said collar,
    a shift fork assembly coupled to one of said collars and a clutch actuating linkage coupled to another of said collars.

2. The multiplexed mechanical shift assembly of claim 1 further including at least one synchronizer clutch engaged and translated by said shift fork assembly and a friction clutch actuated by said clutch actuating linkage.

3. The multiplexed mechanical shift assembly of claim 1 wherein said bi-directional linear actuator includes a planetary roller screw assembly driven by an electrical motor.

4. The multiplexed mechanical shift assembly of claim 1 wherein said output member includes three circumferentially alternating regions of threads and no threads.

5. The multiplexed mechanical shift assembly of claim 1 wherein said collars each include three alternating regions of threads and no threads.

6. The multiplexed mechanical shift assembly of claim 1 further including a second bi-directional actuator having an output member, a plurality of spaced apart collars on said output member, a two position actuator associated with each of said collars and a clutch coupled to one of said collars and a shift fork assembly coupled to another of said collars.

7. The multiplexed mechanical shift assembly of claim 1 wherein said at least one shift fork assembly and said clutch actuating linkage are associated with transmission components on one countershaft.

8. A multiplexed electromechanical shift assembly comprising, in combination,
a bi-directional linear actuator having an elongate output member including a plurality of axially extending segments of circumferentially discontinuous male threads,
at least two spaced apart collars disposed about said output member, each of said collars including a like plurality of segments of discontinuous female threads complementary to said male threads,
a two position actuator coupled to each of said collars for rotating said collar between a first position and a second position,
a synchronizer clutch and a shift fork assembly operably disposed between one of said collars and said synchronizer clutch and
an input clutch and a clutch linkage operably disposed between another of said collars and said clutch.

9. The multiplexed electromechanical shift assembly of claim 8 wherein said bi-directional linear actuator includes a brushless direct current electrical motor and a position transducer.

10. The multiplexed electromechanical shift assembly of claim 8 wherein said bi-directional linear actuator includes a planetary roller screw assembly driven by an electrical motor.

11. The multiplexed electromechanical shift assembly of claim 8 wherein said output member includes three circumferentially alternating regions of threads and no threads.

12. The multiplexed electromechanical shift assembly of claim 8 wherein said collars each include three alternating regions of threads and no threads.

13. The multiplexed electromechanical shift assembly of claim 8 further including a second bi-directional actuator having a second output member, a plurality of spaced apart collars on said second output member, a two position actuator associated with each of said collars and a clutch coupled to one of said collars and at least one shift fork assembly coupled to another of said collars.

14. The multiplexed electromechanical shift assembly of claim 8 wherein said at least one shift fork assembly and a clutch actuating linkage are associated with transmission components on one countershaft.

15. A multiplexed electromechanical shift assembly for a dual clutch transmission comprising, in combination,
a first and a second bi-directional linear actuator each having an output member including axially extending segments of circumferentially discontinuous male threads,
a plurality of spaced apart collars disposed on said output members, each of said collars including segments of discontinuous female threads complementary to said male threads,
a two position actuator coupled to each of said collars for rotating said collar,
a first plurality of shift fork and rail assemblies and a first clutch linkage associated with said collars disposed on said output member of said first linear actuator, and
a second plurality of shift fork assemblies and a second clutch linkage associated with said collars disposed on said output member of said second linear actuator.

16. The multiplexed electromechanical shift assembly of claim 15 wherein said bi-directional linear actuators include a planetary roller screw assembly driven by an electrical motor.

17. The multiplexed electromechanical shift assembly of claim 15 wherein said output members include three circumferentially alternating regions of threads and no threads.

18. The multiplexed electromechanical shift assembly of claim 15 wherein said collars each include three alternating regions of threads and no threads.

* * * * *